United States Patent [19]

Volk, Jr.

[11] 4,340,937
[45] Jul. 20, 1982

[54] AUTOMATIC CONTROL FOR A PELLET PRODUCING APPARATUS

[75] Inventor: Joseph A. Volk, Jr., Florissant, Mo.

[73] Assignee: Beta Corporation of St. Louis, Bridgeton, Mo.

[21] Appl. No.: 139,841

[22] Filed: Apr. 14, 1980

[51] Int. Cl.³ .......................... G05B 1/02; G05B 13/02
[52] U.S. Cl. ..................................... 364/468; 364/153; 364/173
[58] Field of Search ............... 364/468, 469, 476, 477, 364/557; 426/69, 630, 635, 636, 658; 137/2

[56] References Cited

U.S. PATENT DOCUMENTS

| 3,174,298 | 3/1965 | Kleiss | 364/477 |
| 3,255,975 | 6/1966 | Malin et al. | 364/468 |
| 3,573,924 | 4/1971 | Zarow | 426/69 |
| 3,707,978 | 1/1973 | Volk, Jr. | 137/2 |
| 3,812,713 | 5/1974 | Karlsson | 364/557 |
| 3,932,736 | 1/1976 | Zarow et al. | 364/468 |

Primary Examiner—Felix D. Gruber
Attorney, Agent, or Firm—Rogers, Eilers & Howell

[57] ABSTRACT

A control system for an automatic pellet producing system for producing pellets from a milled material of a selected composition. A difference in temperature of the material across the mill ($\Delta T$ mill), is sensed and the proportion of selected ingredients of the material is controlled prior to entering the pellet mill to maintain $\Delta T$ mill within a prescribed range.

7 Claims, 2 Drawing Figures

AUTOMATIC CONTROL FOR A PELLET PRODUCING APPARATUS

BACKGROUND AND SUMMARY OF THE INVENTION

This invention is an improvement of the Automatic Pellet Producing System of U.S. Pat. No. 3,932,736, the entirety of which is incorporated herein by reference. Essentially, that patent discloses an automatic pellet producing system wherein the moisture content of the material at the mill is automatically controlled to within a prescribed range, and the feed rate of the material to the mill is automatically controlled in response to the moisture content control. In a preferred embodiment of that patent, the moisture content is controlled by sensing a temperature difference ($\Delta T$) which is the difference between the temperature of the material at a first location of the material prior to entering the mill, and the temperature of the material at a second location as it enters the mill. The referenced patent also includes, among other features, a load control system for automatically controlling the load on the pellet mill when the moisture control conditions are satisfied.

The present invention represents an improvement over the cited patent in the selection of $\Delta T$. As explained, the $\Delta T$ of the referenced patent is measured by sensing the temperature of the material at first and second locations prior to entering the mill.

In accordance with the present invention, $\Delta T$ is measured by sensing temperatures of the material across the mill ($\Delta T$ mill), or a parameter that is directly related to the $\Delta T$ across the mill.

One of the problems in producing pellets has been to control the moisure content of the material to be pelleted. For a given formulation, for proper pellet consistency, minimum load on the mill, and maximum production, are interrelated. It has been discovered that $\Delta T$ mill is very closely, if not directly, related to the work done by the mill in producing the pellets. The greater $\Delta T$ mill, the greater the work, and conversely the lower $\Delta T$ mill, the less the work done by the mill in producing the pellets. It has also been discovered that for a given feed formulation there is a range of $\Delta T$ mill that will give good pellet quality, keep the work done by the mill to a minimum, and allow maximum pellet production.

One of the advantages of the present invention is that the use of $\Delta T$ mill takes into account the peculiarities inherent within the mill itself. Although the specifications of mills of the same type, load capacity, etc., may appear to be the same, there are always inherent characteristics peculiar to each machine. For example, when comparing supposedly identical machines, with both operating at the same work level and at the same production speed, the load on one may be less than the other. By operating both machines within a prescribed $\Delta T$ mill range, the production rate of each can be adjusted for maximum production within the prescribed load limitations.

Generally, in accordance with the present invention, a prescribed $\Delta T$ mill range is selected. $\Delta T$ mill is then sensed and the proportion of certain ingredients in the formulation is controlled to maintain $\Delta T$ mill within the prescribed range.

In a preferred embodiment of the invention, $\Delta T$ mill is sensed by sensing the temperature of the material as it enters the mill, sensing the temperature of the material at the output of the mill, and measuring the difference between these temperatures ($\Delta T$ mill). The amount of moisture in the material is controlled to maintain $\Delta T$ mill within the selected range. The moisture content may be controlled by controlling the amount of steam, water, dry heat, or some other suitable moisture additive or moisture controlling ingredient. The more moisture in the material, the lower the $\Delta T$ mill. The less amount of moisture, the greater the $\Delta T$ mill. Upon satisfying the $\Delta T$ mill condition, the feed rate of the material into the mill is controlled for maximum productivity within the load limitations of the mill.

DETAILED DESCRIPTION OF A PREFERRED EMBODIMENT

Figure 1:
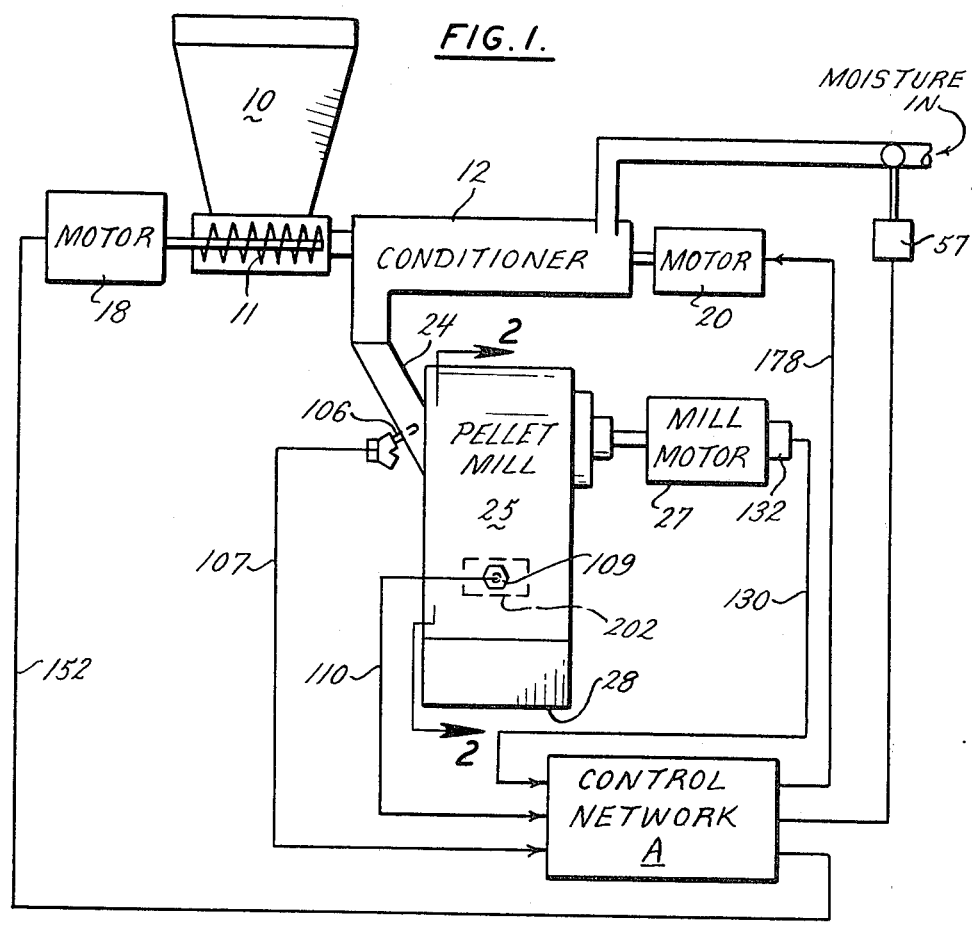
FIG. 1 is a schematic of the control of the present invention.
Figure 2:
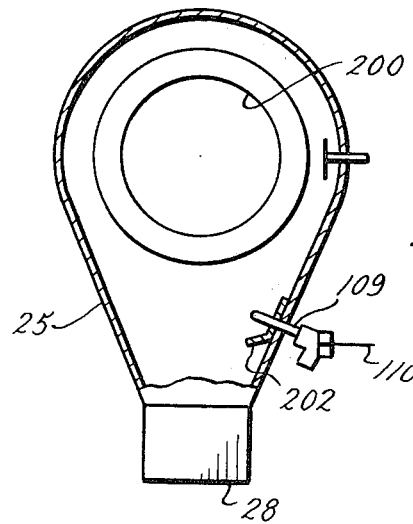
FIG. 2 is a view in section taken generally along the line 2—2 of FIG. 1.

A preferred embodiment of the invention will now be described with reference to the drawing and to reference U.S. Pat. No. 3,932,736. It will be noted that the drawing is a schematic of the control system which represents a portion of that disclosed in the referenced patent. Essentially, the same network as shown in FIGS. 1, 2 and 3 of the referenced patent can be used with the present invention except that the temperature sensors 106 and 109 are relocated to the input and output of the pellet mill for measuring $\Delta T$ mill rather than the $\Delta T$ of the referenced patent.

Thus, using the same reference numerals as in the referenced patent, there is shown a bin 10 for holding a supply of material from which pellets are to be made. In the case of feed pellets, the material is preferably in milled form and is composed from any of a great variety of animal feed formulations including the numerous ones most commonly used in the art. The milled material is fed by means of an appropriate feed screw 11, auger, gravimetric feeder, or the like, into a conditioner 12. The feed screw 11 is operated, or made to rotate, by means of a variable speed screw motor 18. The conditioner includes rotating paddles or the like to aggitate and add turbulance to the material as the material moves therethrough. A motor 20 operates the aggitator.

From the conditioner, the material is fed down a chute 24 and into a pellet mill or pellet producing means 25. The pellet mill 25 might, for example, be of the die type and comprise a rotating cylinder with radial holes therein and rollers mounted within the cylinder. The material is fed into the cylinder and by interaction of the cylinder and rollers is forced through the holes in the cylinder and severed to form pellets. The die or pellet mill is operated by a relatively high horsepower electric motor 27. After severing, the pellets fall through an opening 28 at the bottom of the mill.

Means are provided for supplying one or more moisture controlling ingredients to the material within the conditioner. These ingredients might, for example, include steam, water, dry heat, or some other suitable moisture controlling ingredient. The amount of such ingredient is controlled by a modulating control valve and motor 57 which in turn is controlled from output signals from a control network A.

The control network A may be that shown and described in the referenced U.S. Pat. No. 3,932,736, the entirety of which is incorporated herein by reference, and essentially consists of the network shown in FIGS. 1, 2 and 3 of the drawings of that referenced patent. The control network A also has outputs 152 and 178 to the feed screw motor 18 and conditioner motor 20 for purposes as described in the referenced patent. Also as described in the referenced patent, a transducer 132 is magnetically coupled to the mill motor 27, and a signal representing the load on the motor is carried by a conductor 130 to an input of the control network A.

As with the referenced patent, a temperature sensor 106 senses the temperature of the material and feeds a signal representing that temperature through a conductor 107 to an input of the control network. Another temperature sensor 109 senses the temperature of the material at another location and feeds the signal representing that temperature through a conductor 110 to another input of the control network. However, unlike the referenced patent, where the sensors 106 and 109 are both located to sense the temperature of the material before it enters the pellet mill, with the present invention, the sensors are positioned at the input and output of the pellet mill to sense the temperature of the material as it enters and leaves the mill. Thus, the control network senses $\Delta T$ across the mill ($\Delta T$ mill), and controls the valve and motor 57 to modulate the amount of moisture controlling ingredient mixed with the material in the conditioner in order to maintain $\Delta T$ mill within prescribed limits. This is accomplished within the control network in the same manner that $\Delta T$ is controlled in the referenced patent.

By way of example only, for the production of certain feed pellets, $\Delta T$ mill may be 12°–18° F., although for the production of other types of pellets $\Delta T$ may be substantially greater, such as 120° F.

It should further be noted, that the control network also maintains the mill load within the prescribed range and includes an overload control as explained in the referenced patent. Thus, in a preferred embodiment of the present invention, $\Delta T$ mill is maintained within the prescribed range, and with this requirement satisfied, the feed rate of the material may be increased for maximum productivity within a prescribed load range.

In order to obtain an accurate temperature measurement at the sensor 109, it has been found desirable to locate a baffle in the form of an angle plate or bracket 202 within the housing of the mill 25 at the location of the sensor or probe 109. The purpose of the baffle is to impede the flow of pellets as they fall between the mill housing and mill die 200 in order to cause an accumulation of the pellets around the probe. This prevents air turbulence around the probe that would reduce the temperature at the probe and create a false reading.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

I claim:

1. An automatic control system for a pelleting apparatus, the apparatus including a pellet producing means and means for feeding a supply of material to the producing means, said control system comprising means for sensing the temperature of the material near the input of the producing means, means for sensing the temperature of the material near the output of the producing means, and means for measuring the difference between said temperatures ($\Delta T$ mill), and means for automatically controlling the proportion of selected ingredients of the material before entering the producing means in response to said sensing means to maintain $\Delta T$ mill to within a prescribed range.

2. The control system of claim 1 wherein the selected ingredient, the proportion of which is controlled, is moisture.

3. The control system of claim 1 wherein the selected ingredient is steam.

4. The control system of claim 1 wherein the selected ingredient is water.

5. The control system of claim 1 wherein the selected ingredient is dry heat.

6. The control system of claim 1 further comprising means for inhibiting the flow of material at the location of said output temperature sensor to improve the accuracy with which the temperature of the material flowing therepast is sensed.

7. The control system of claim 6 wherein said flow inhibiting means is a baffle.

* * * * *